Nov. 20, 1951     A. C. VIVIAN     2,576,085
PRODUCTION OF HIGH-PRESSURE PIPES AND VESSELS
Filed May 15, 1948
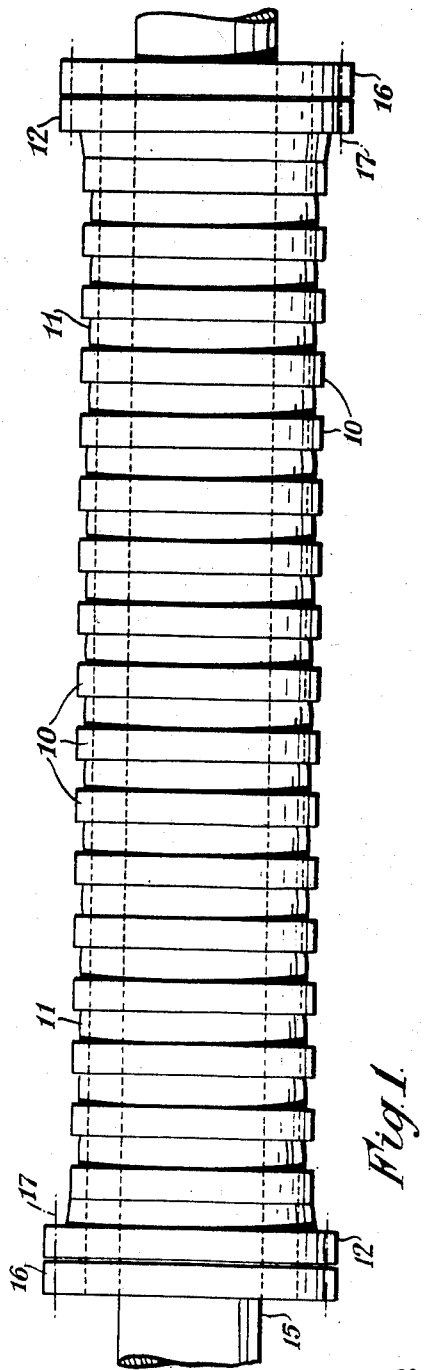
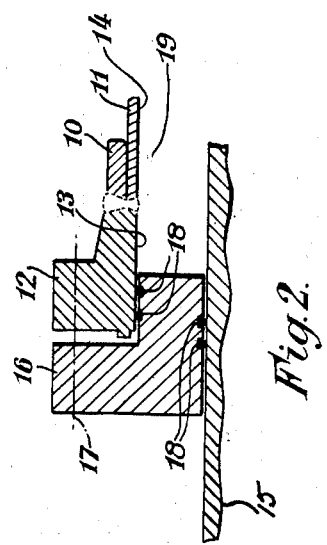
Inventor
Arthur Cecil Vivian,
By Morgan, Finnegan & Durham,
Attorneys.

Patented Nov. 20, 1951

2,576,085

UNITED STATES PATENT OFFICE 2,576,085

PRODUCTION OF HIGH-PRESSURE PIPES AND VESSELS

Arthur Cecil Vivian, London, England, assignor to Anglo-Iranian Oil Company Limited, London, England, a British joint-stock corporation Application May 15, 1948, Serial No. 27,317
In Great Britain May 7, 1947

3 Claims. (Cl. 29—148.2)

1

The invention relates to the production of pipes and vessels for holding fluids under high pressure, and is more particularly concerned with the formation of so-called "banded" pipes and vessels, wherein a number of bands or hoops are shrunk on to a core pipe or vessel.

It is well known in the production of such pipes and vessels, to subject the pipe or vessel, after the bands or hoops have been shrunk on, to an internal pressure which is several times the pressure to which the pipe or vessel is to be subjected in use, such internal pressure first forcing the core pipe or vessel into intimate contact with the hoops or bands and then extending the wall of the pipe or vessel to take up a permanent set in the form of corrugations between the hoops or bands. By operating in this way, the core pipe or vessel and the enclosing hoops or bands are formed into an integral structure which is capable of withstanding a pressure several times the normal working pressure. In subjecting the pipe or vessel to the calculated internal hooping pressure, the core pipe may have a blank flange fixed to each end. Alternatively the core pipe may be supported upon a centre pipe, which is filled with concrete to enable it to withstand the pressure applied by means of end members which are welded both to the core pipe and to the centre pipe.

The invention is concerned with the method of manufacturing banded pipes and vessels, wherein a core pipe is supported upon a pressure-resisting centre pipe by means of end members so as to form an annular space between the core pipe and the centre pipe, liquid under pressure being supplied to said annular space to exert the necessary hooping pressure on the core pipe. The principal object of the invention is to provide a method wherein the degree of hooping depends not only upon the radial pressure exerted within the annular space between the centre pipe and the core pipe but also upon the end load. It is also an object of the invention to provide an arrangement for carrying out such method whereby the end load may be easily and quickly varied, so as to permit any desired degree of hooping.

According to the method of the invention, the core pipe, with the associated hoops or bands, is supported on the centre pipe by means of end members, one at least of which is capable of sliding on the centre pipe during the application of the hooping pressure.

According to the preferred arrangement, the core pipe with the associated hoops or bands,

2 is secured at its ends to the vertical limbs of L-section flanges, the horizontal limbs of said flanges slidably engaging the centre pipe.

Gland joints may be provided between the core pipe and the flanges and between the flanges and the centre pipe. Said gland joints may advantageously consist of rubber rings or L-section leathers.

With the above arrangement, the configuration of the core pipe between the hoops or bands is determined not only by the radial pressure exerted within the annular space between the core pipe and the centre pipe but also by the end load, since the end members can slide over the centre pipe during the application of hooping pressure to the core pipe, and it will be understood that by varying the relative dimensions of the end members and of the centre pipe, any desired degree of hooping of the core pipe may be achieved.

The invention will now be described by way of example with reference to the accompanying drawings, wherein:

Figure 1 is a side elevation showing the assembly ready for hooping, and

Figure 2 is a fragmentary section through one end of the assembly.

Hoops or bands 10 are shrunk on to a core pipe 11 in the usual way, a hoop or band being positioned at each end of the core pipe. An annular flange 12 is then welded to each end of the core pipe assembly with the inner annular surface 13 of the flange forming an extension of the inner surface 14 of the core pipe, the flanges being welded to the core pipe and the end hoops or bands. The assembly is concentrically supported upon a centre pipe 15, by means of annular members 16 of L-section, which are bolted or otherwise temporarily joined to the flanges 12 as indicated at 17. The L-section members 16 are slidably supported on the centre pipe by gland joints 18, conveniently rubber rings or U-leathers. Similar gland joints 18 are also provided between the annular members 16 and the flanges 12, whereby a fluid-tight joint is made between them so that it is unnecessary to machine the adjacent radial faces of the assembly before hooping, since intimate contact between said faces is unnecessary.

Liquid is supplied under pressure to the annular space 19 between the centre and core pipes, water being a convenient liquid for the purpose and provision being made for clearing the air from said annular space. The pressure is gradually built up within the annular space until the determined hooping pressure is reached. The hooping pressure is determined having regard to various factors including the thickness of the wall of the core pipe, the spacing of the hoops or bands, and the properties of the metals or alloys constituting the core pipe and the hoops or bands. We have found that a pressure of about 4000 lbs./sq. in. is satisfactory in the case where a vessel of 4′ 6″ diameter with a core pipe thickness of 1⅝″ is to have a bursting pressure of 6000 lbs./sq. in. The diameter of the centre pipe for this particular case is such that the product of the hooping pressure and the cross-sectional area of the annular space is equivalent to the desired end load of about 3,000 tons.

In general the end load is calculated, for any particular diameter of vessel and wall thickness, so that at the hooping pressure the swelling of the core pipe between the bands is limited to a prescribed amount. The basic principle is that part of the hooping pressure on the core pipe between bands is carried by circumferential stretch and the remainder is transferred by longitudinal tension to the bands.

On the completion of the hooping operation, the pipe or vessel is stress-relieved, or alternatively the stress-relief is carried out before hooping. The sliding end members and the centre pipe are then removed, and the pipe or vessel fitted with dished or conical ends with suitably machined joints and subjected to a final test pressure of 50% above the working pressure.

I claim:

1. A method for the manufacture of high-pressure pipes, comprising shrinking a number of bands on to a core pipe at intervals along its external surface, positioning a centre pipe within said core pipe, supporting the core pipe on the centre pipe by means of annular end members which are secured to the ends of the core pipe and which slidably engage the center pipe, and supplying liquid under pressure to the annular space between the core pipe and the centre pipe so as to cause the core pipe to expand and take up a permanent set in the spaces between the bands, the degree of expansion of the core pipe being determined by the radial pressure thereon and the outwardly acting longitudinal load at each end thereof caused by the pressure of the liquid on the annular end members.

2. A method according to claim 1 in which the annular end members are of L-section each having a radial and a lateral limb with respect to the centre pipe, the ends of the core pipe being secured, as by bolting, to the radial limbs of the end members and the lateral limbs extending between the core and centre pipes so as to form an annular space therebetween and being in slidable engagement with the centre pipe.

3. A method according to claim 2 in which the core pipe is secured, as by welding, at its ends to annular flanges which in turn are secured, as by bolting, to the radial limbs of the end members.

ARTHUR CECIL VIVIAN.

REFERENCES CITED

The following references are of record in the file of this patent:

UNITED STATES PATENTS

| Number | Name | Date |
|---|---|---|
| 1,095,477 | Still | May 25, 1914 |
| 1,115,411 | Dixon | Oct. 27, 1914 |
| 1,271,455 | Fitts | July 2, 1918 |
| 1,320,430 | Wheeler | Nov. 4, 1919 |
| 1,733,455 | Ferrand | Oct. 29, 1929 |
| 1,777,555 | D'Yarmett | Oct. 7, 1930 |
| 1,861,304 | Etheridge | May 31, 1932 |
| 1,975,422 | Hellenbroich | Oct. 2, 1934 |
| 2,028,151 | Grant | Jan. 21, 1936 |
| 2,036,475 | Heimbach | Apr. 7, 1936 |
| 2,050,228 | Mantle | Aug. 4, 1936 |
| 2,421,276 | Lotz | May 27, 1947 |
| 2,430,100 | Brumder et al. | Nov. 4, 1947 |